United States Patent
Leroy et al.

(10) Patent No.: US 10,584,938 B2
(45) Date of Patent: Mar. 10, 2020

(54) FLEXIBLE COVER FOR A MISSILE CONTAINER

(71) Applicant: MBDA FRANCE, Le-Plessis-Robinson (FR)

(72) Inventors: Bertrand Leroy, Le Plessis-Robinson (FR); Pascal Herquel, Le Plessis-Robinson (FR)

(73) Assignee: MBDA FRANCE, La Plessis-Robinson (FR)

( * ) Notice: Subject to any disclaimer, the term of this patent is extended or adjusted under 35 U.S.C. 154(b) by 26 days.

(21) Appl. No.: 15/749,409

(22) PCT Filed: Jul. 20, 2016

(86) PCT No.: PCT/FR2016/000123
§ 371 (c)(1),
(2) Date: Jan. 31, 2018

(87) PCT Pub. No.: WO2017/021593
PCT Pub. Date: Feb. 9, 2017

(65) Prior Publication Data
US 2018/0216912 A1     Aug. 2, 2018

(30) Foreign Application Priority Data
Aug. 5, 2015   (FR) ..................................... 15 01675

(51) Int. Cl.
*F41F 3/077*   (2006.01)
*B32B 15/14*   (2006.01)
(Continued)

(52) U.S. Cl.
CPC ............ *F41F 3/077* (2013.01); *B32B 15/043* (2013.01); *B32B 15/14* (2013.01); *B32B 25/02* (2013.01);
(Continued)

(58) Field of Classification Search
CPC .................................. F41F 3/077; F41F 3/052
(Continued)

(56) References Cited

U.S. PATENT DOCUMENTS 3,742,814 A * 7/1973 Kroh ....................... F41F 3/077
89/1.8
3,789,729 A * 2/1974 Aupy ....................... F41F 3/04
89/1.8

(Continued)

FOREIGN PATENT DOCUMENTS

| EP | 0308344 A1 | 3/1989 |
| FR | 2926360 A1 | 7/2009 |
| JP | 2002162193 A | 6/2002 |

OTHER PUBLICATIONS

Written Opinion of the International Searching Authority dated Oct. 7, 2016, issued in corresponding International Application No. PCT/FR2016/000123, filed Jul. 20, 2016, 4 pages.
(Continued)

*Primary Examiner* — Jonathan C Weber
(74) *Attorney, Agent, or Firm* — Christensen O'Connor Johnson Kindness PLLC

(57) ABSTRACT

A flexible cover comprising at least one, so-called composite, layer, formed from a composite material consisting of at least one fabric and at least one elastomer and a flat metal blade secured to the composite layer by elastomer and comprising pre-cut lines for fragilisation of the flexible cover, the pre-cut lines being arranged so as to create areas in the form of petals, the composite layer and the metal blade being designed so as to return to an initial position once the flexible cover has been opened.

9 Claims, 3 Drawing Sheets

(51) Int. Cl.
 B32B 15/04 (2006.01)
 B32B 25/02 (2006.01)
 F16J 15/06 (2006.01)
 F16J 15/12 (2006.01)
(52) U.S. Cl.
 CPC ........... *F16J 15/064* (2013.01); *F16J 15/067* (2013.01); *F16J 15/122* (2013.01); *B32B 2250/40* (2013.01); *B32B 2260/023* (2013.01); *B32B 2260/048* (2013.01); *B32B 2262/02* (2013.01); *B32B 2262/10* (2013.01); *B32B 2307/51* (2013.01); *B32B 2307/7242* (2013.01); *B32B 2319/00* (2013.01); *B32B 2435/02* (2013.01); *B32B 2581/00* (2013.01)
(58) Field of Classification Search
 USPC ...................................................... 89/1.817
 See application file for complete search history.

(56) References Cited

U.S. PATENT DOCUMENTS

| | | | | |
|---|---|---|---|---|
| 4,498,368 | A * | 2/1985 | Doane | H01Q 15/142 220/89.2 |
| 4,662,288 | A * | 5/1987 | Hastings | B32B 19/04 109/10 |
| 5,993,921 | A * | 11/1999 | Hunn | B32B 17/10018 156/69 |
| 6,123,005 | A | 9/2000 | Kuchta et al. | |
| 7,520,204 | B2 * | 4/2009 | Williams | F41F 3/077 220/200 |
| 7,601,654 | B2 * | 10/2009 | Bhatnagar | F41H 5/0457 181/292 |
| 8,256,340 | B2 * | 9/2012 | Bohs | F41F 3/077 220/265 |
| 8,418,593 | B2 * | 4/2013 | Truyman | F41F 3/042 89/1.8 |
| 8,726,588 | B2 * | 5/2014 | Jakus | B65D 90/36 220/89.2 |
| 2004/0209020 | A1 * | 10/2004 | Castiglione | B32B 17/10018 428/34 |
| 2006/0096449 | A1 * | 5/2006 | Williams | F41F 3/077 89/1.817 |
| 2009/0114083 | A1 * | 5/2009 | Moore, III | F41H 5/0421 89/36.02 |
| 2010/0236391 | A1 * | 9/2010 | Baldi | F41F 3/04 89/1.815 |
| 2011/0011251 | A1 | 1/2011 | Truyman | |
| 2012/0319857 | A1 * | 12/2012 | Brazier | F16K 17/16 340/679 |

OTHER PUBLICATIONS

International Preliminary Report on Patentability dated Feb. 6, 2018, issued in corresponding International Application No. PCT/FR2016/000123, filed Jul. 20, 2016, 1 page.
International Search Report dated Oct. 7, 2016, issued in corresponding International Application No. PCT/FR2016/000123, filed Jul. 20, 2016, 2 pages.
Written Opinion of the International Searching Authority dated Oct. 7, 2016, issued in corresponding International Application No. PCT/FR2016/000123, filed Jul. 20, 2016, 5 pages.

* cited by examiner

FLEXIBLE COVER FOR A MISSILE CONTAINER

The present invention relates to a flexible seal for a missile container.

It is known that the function of a container seal is to hermetically seal the container in order to protect a missile installed therein. The seal must be able to open in order to release the missile or the propellant gases when firing the latter.

Seals are generally divided into two categories:
breakable seals, which are generally made of composite materials; and
self-opening mechanisms, most generally made of metal.

These solutions have various disadvantages. Specifically, the disadvantages of these solutions are:
for seals made of composite materials:
  the presence of debris, which is projected at high speeds in different directions and poses a danger to nearby equipment, and sometimes even to the missile itself; and
  in some cases, a significant force on the radome of the missile when passing through the seal during the launch phase; and
for self-opening mechanisms:
  more complex safety management in order to ensure opening;
  a much larger mass; and
  high production costs.

FR 2 926 360 discloses a deformable seal that is intended to be mounted at the base of a missile container, and is capable of opening under the thrust of the propellant gases of a missile contained in the container and of reclosing after the missile has been ejected. The seal includes a grate and a stack of resilient sheets enclosed between a thermal protection membrane and a sealing membrane both upstream and downstream, and held between an upstream support frame and a downstream support frame.

The object of the present invention is to overcome at least some of the above-mentioned disadvantages. Specifically, the object is to overcome the problem of the debris which poses a danger to equipment, whilst ensuring a moderate force on the radome of the missile, a low mass and reduced production costs.

The present invention relates to a flexible seal that is intended to be mounted on a missile container and is capable of opening under a thrust.

According to the invention, the flexible seal comprises:
at least one layer, referred to as a composite layer, made of a composite material consisting of at least one fabric and at least one elastomer; and
at least one flat metal sheet, rigidly connected to said composite layer by the elastomer and including pre-cut lines of weakness in the seal, the pre-cut lines being arranged so as to create petal-shaped regions.

Advantageously, at least the composite layer and the metal sheet are designed to return to their initial position after the seal has been opened.

Thus, by virtue of the invention, the fabric/s that are introduced into the elastomer to form the composite material ensure the mechanical strength of the flexible seal, which is also made hermetic by means of the elastomer in particular. The metal sheet, which is inserted in the elastomer of the composite material, makes it possible for said composite material (elastomer/fabric) to be precisely cut, along the length of the pre-cut lines, which simplifies opening. Furthermore, the composite layer and the metal sheet, thus formed, make it possible for the flexible seal to return to its initial position after opening.

A flexible seal is thus obtained which prevents the creation of debris (which poses a danger to equipment), whilst ensuring a moderate force on the radome of the missile, a low mass and reduced production costs.

It should be noted that the above-mentioned FR 2 926 360 does not teach, in particular:
a composite layer, made of a composite material consisting of at least one fabric and at least one elastomer; and
that the composite layer is rigidly connected, by the elastomer, to a flat metal sheet including pre-cut lines of weakness in the seal.

Advantageously, the flexible seal comprises:
two composite layers arranged on either side of the metal sheet;
an anti-friction covering on a surface, referred to as an inner surface, which is intended to be positioned towards the interior of the container. This anti-friction covering makes it possible in particular to limit friction when the missile passes through.

Furthermore, advantageously, the pre-cut lines are arranged radially with respect to the centre of the seal.

In addition, in a particular embodiment, said at least one composite layer and the metal sheet are arranged such that at least some of the pre-cut lines of the metal sheet are parallel to at least one direction of the thread of the fabric of the composite material (of the composite layer).

In a preferred embodiment, the metal sheet is a single part in which said pre-cut lines are made.

Advantageously, the metal sheet also comprises recesses for receiving a portion of the elastomer of said at least one composite layer.

The present invention also relates to a missile container, which comprises at least one flexible seal as described above.

The present invention further relates to a weapons system which includes at least one missile container of this type.

The accompanying drawings will give a clear understanding as to how the invention can be embodied. In these drawings, identical references refer to similar elements.

Figure 1:
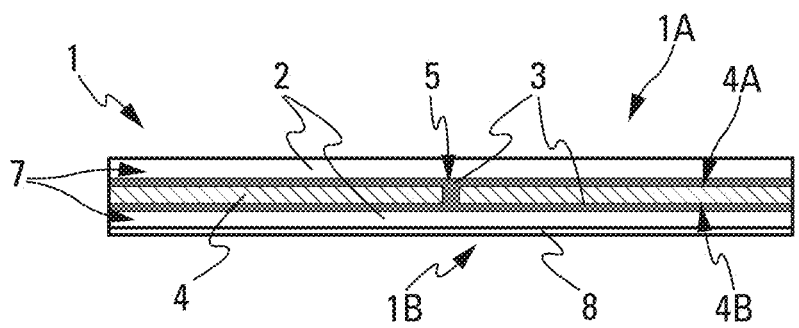
FIG. 1 is a schematic cross section of a preferred embodiment of a flexible seal according to the invention.

The flexible seal 1 depicting the invention and shown schematically in FIG. 1 is intended to be mounted on a missile container (not shown).

This missile container is part of a weapons system (also not shown).

The function of the flexible seal 1 is to hermetically seal the container in order to protect a missile installed therein.

The flexible seal must be able to open in order to release the missile or the propellant gases when firing the latter.

In order to do this, the flexible seal 1 is designed to open under a thrust. In the context of the present invention, this thrust can be generated when firing by contact between the flexible seal and the missile or by an internal overpressure generated by dedicated means or by the propellant gases of the missile.

Figure 3:
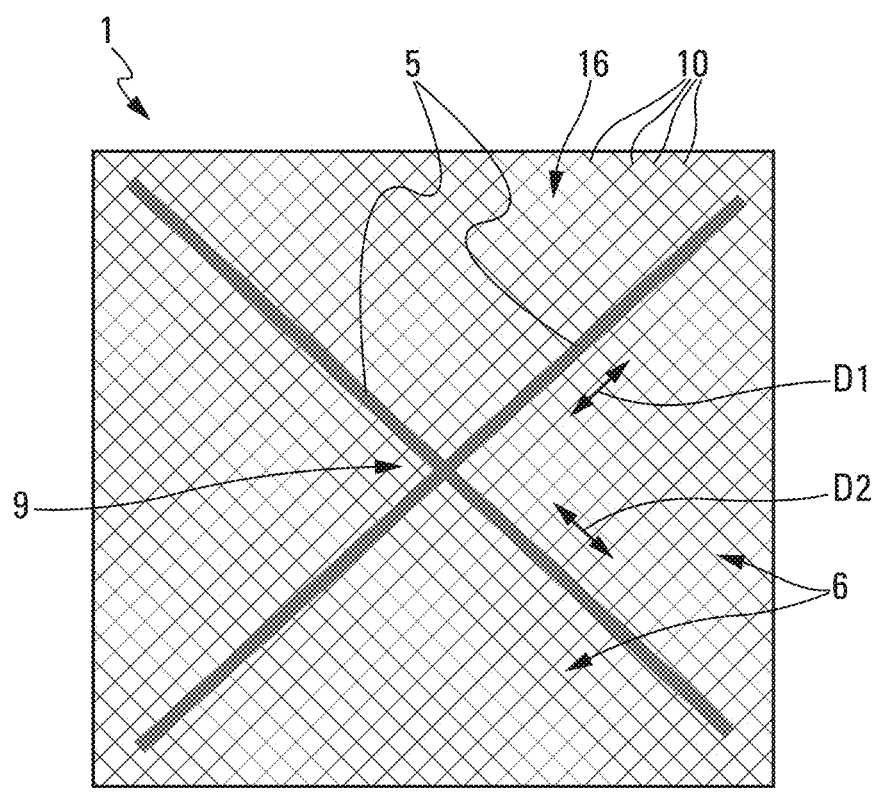
FIGS. 3 and 4 are two schematic plan views showing different embodiments of pre-cut lines in a metal sheet of a flexible seal.
Figure 2:
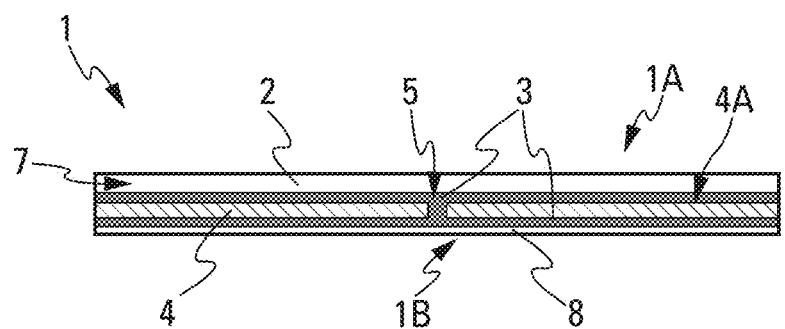
FIG. 2 is a schematic cross section of a further embodiment of a flexible seal according to the invention.
Figure 4:
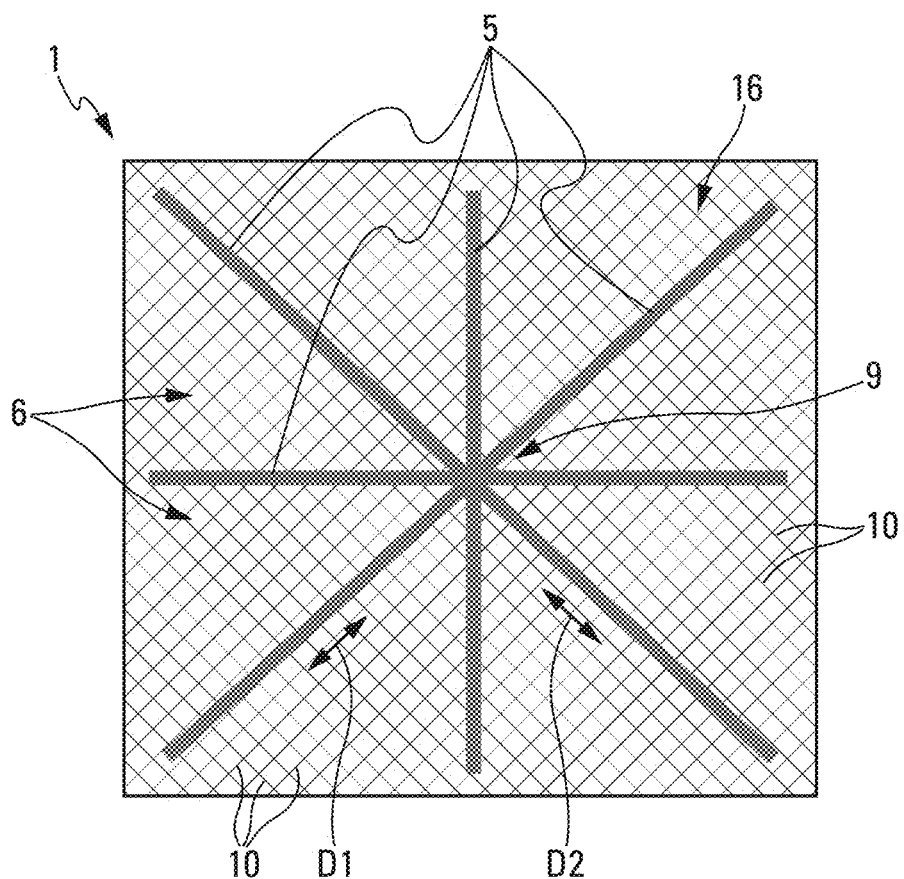

According to the invention, the flexible seal 1 comprises, as shown in FIGS. 1 and 2:
- at least one layer (or skin) 2, referred to as a composite layer, this composite layer 2 being made of a composite material 7 consisting of at least one fabric and at least one elastomer; and
- at least one flat metal sheet 4. This metal sheet 4 is rigidly connected (or joined or attached) to the composite layer 2 by the elastomer 3 of the composite material 7, and includes pre-cut lines 5 (or slots) of weakness in the seal 1, the pre-cut lines 5 being arranged so as to create petal-shaped regions 6 (FIGS. 3 and 4).

Furthermore, the composite layer 2 and the metal sheet 4 are designed to return to their initial position after the flexible seal 1 has been opened.

The metal sheet 4, which is inserted in the elastomer 3 of the composite material 7, makes it possible for the composite material (elastomer/fabric) to be precisely cut along the length of the pre-cut lines 5 of weakness.

In addition, the fabric/s 16 (FIGS. 3 and 4) that are inserted in the elastomer 3 to form the composite material 7 ensure the mechanical strength of the flexible seal 1. The fabric/s are made, in particular, from carbon fibres or glass fibres, or even textile fibres (polyester, polyamide, . . . ).

The composite material 7 also makes it possible, by virtue of the elastomer 3, to make the flexible seal 1 hermetic. The elastomer 3 can be made of different materials. Preferably, this elastomer is a butyl elastomer, neoprene elastomer, silicone elastomer, . . . .

In addition, the flexible seal 1 is dimensioned so as to allow the petals 6 to reclose after firing.

In a first embodiment shown in FIG. 1, the flexible seal 1 comprises two composite layers 2 which are arranged on either side of the metal sheet 4, on the surfaces 4A and 4B thereof.

Furthermore, in a second embodiment shown in FIG. 2, a single composite layer 2 (fabric/elastomer) is provided on the external surface 4A of the metal sheet 4, i.e. on the surface 1A which will be oriented towards the exterior of the container in the mounted position of the flexible seal 1. This makes it possible to limit the forces required for opening.

FIG. 1 also shows the inner surfaces 1A and 4B of the flexible seal 1 and of the metal sheet 4.

Furthermore, as shown in FIGS. 1 and 2, the flexible seal 1 also comprises an anti-friction covering 8 on the inner surface 1B, which is therefore intended to be positioned towards the interior of the container.

This anti-friction covering 8 makes it possible, in particular, to limit friction when the missile passes through the flexible seal 1.

The anti-friction covering 8 is made for example from a metal material, which makes it possible, in addition to reducing the friction coefficient, for electrical continuity to be provided.

The metal sheet 4 is therefore split (FIGS. 1 to 4), which facilitates tearing of the composite material 7 (fabric/elastomer) of the composite layer 2 in specific directions. Preferably, the pre-cut lines 5 are arranged radially with respect to the centre 9 of the flexible seal 1, as shown in FIGS. 3 and 4.

In the embodiment shown, the composite layer/s 2 and the metal sheet 4 are arranged such that at least some of the pre-cut lines 5 of the metal sheet 4 match at least one direction D1, D2 of at least some of the threads (or fibres) 10 of the fabric 16 of the composite material 7 of the composite layer 2. Specifically, the pre-cut lines 5 are parallel to the directions D1 and D2 of the threads 10 of the fabric 16.

Depending on the size of the missile and of the seal, the metal sheet 4 has a greater or lesser number of pre-cut lines 5 (or slots), for example two lines oriented along the diagonals such as in the example of FIG. 3, or four lines oriented along the diagonals and the perpendicular bisectors of the sides as shown in FIG. 4.

The pre-cut lines may of course have other shapes in the context of the present invention.

Figure 5:
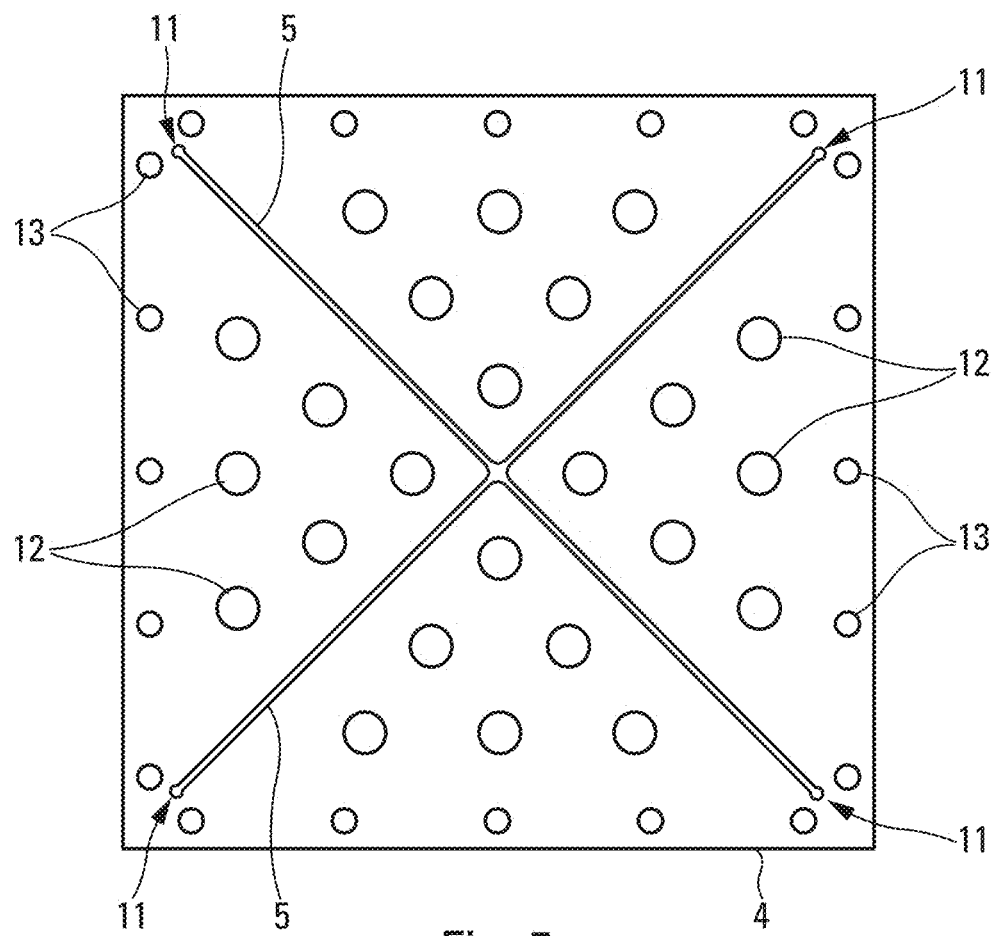
FIG. 5 is a plan view of a preferred embodiment of a metal sheet of a flexible seal.

Furthermore, in a preferred embodiment, shown in FIG. 5, the metal sheet 4 is a single part in which the pre-cut lines 5 are made to ensure tearing (along the diagonals, for example). The ends of the pre-cut lines 5 are each provided with a circular hole (11).

As shown in FIG. 5, the metal sheet 4 comprises additional recesses 12 of any possible shape, in particular circular, for receiving a portion of the elastomer of the composite layer/s 2. This makes it possible to ensure that the elastomer is well distributed and properly attached.

Furthermore, the metal sheet 4 also includes openings (or holes) 13 for clamping screws to pass through.

Figure 6:
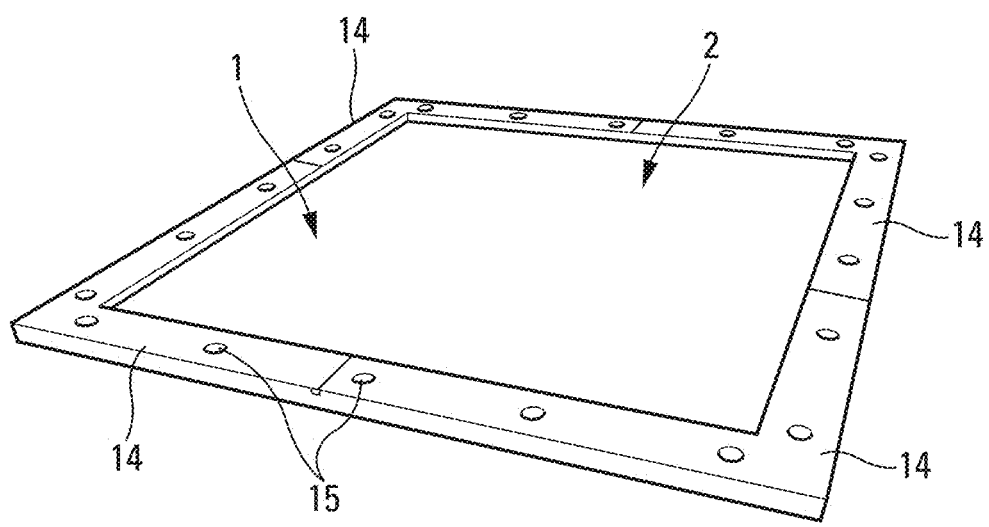
FIG. 6 is a schematic perspective view of attachment means of a flexible seal.

Thus, in this case, a plurality of elements 14 (or flanges), for example made of stainless steel, in particular four elements 14 in the shape of right-angles as shown in the example of FIG. 6, make it possible to clamp the flexible seal 1 onto the container (not shown) by using screws passing through holes 15.

By way of illustration, the flexible seal 1 can be designed for containers of varying dimensions, preferably:
- for a cylindrical container, the diameter of which is between 100 mm (millimetres) and 1000 mm; and
- a parallelepipedal container, the cross section of which is between 100×100 mm and 1000×1000 mm.

In addition, the flexible seal 1 is preferably designed to withstand pressure of between 1 and 5 bar, and to open from 5 bar.

The flexible seal 1 as described above has the following advantages in particular:
- simplified opening and reclosing;
- reduced production costs;
- reduced mass;
- no production of debris.

A method for producing a flexible seal 1 as described above is now disclosed in a general manner. This method of production includes, in particular, the following steps:
- impregnating the fabric by placing an elastomer plate above and below the fabric, then calendering the whole in order to impregnate the fabric into the elastomer;
- moulding the petals with the metal sheet; and—assembling the different layers of the flexible seal by means of vulcanisation.

The operation of the flexible seal 1 is also specified. When generating a thrust in order to open the flexible seal 1 that closes the container, with a view to firing a missile installed therein, from a certain pressure (for example 5 bar), the flexible seal 1 (specifically, the composite layer/s 2 and, where necessary, also the anti-friction covering 8) tears along the pre-cut lines 5, and the flexible petals 6 thus formed bend outwards to open the flexible seal 1 and clear the path for the missile. After the missile has been released from the container, the flexible petals 6 return to their initial position so that the flexible seal 1 is close to its pre-opening position in order to enable the cell door to be closed.

One possible application of the invention relates to a container of a missile launcher which is installed on a ship. A container of this type generally comprises a series of cells, each cell being intended to receive a missile placed in the container thereof. The upper portion of a cell opens in the region of the deck of the ship and is closed, outside of the launching phases, by a door. The lower portion of a cell comprises a communication opening which opens into a chamber intended to receive the gases emitted during the launch of a missile. The upper and lower portions of each container are tightly sealed by a cover provided with an upper flexible seal, such as the flexible seal 1 specified above, and by a base also provided with, for example, a lower flexible seal such as the flexible seal 1. The interior volume of the container is, in general, filled with an inert gas that is in overpressure in comparison with the atmosphere. When launching the missile, a cell door is opened, and the missile is fired. The propellant gases therefore greatly increase the pressure and the temperature inside the container, and this perforates the upper flexible seal of the container (and where necessary opens the lower flexible seal). After firing, the flexible seal/s return approximately to their initial position and the cell door is reclosed.

The invention claimed is:

1. A flexible seal that is intended to be mounted on a missile container and is capable of opening under a thrust, the flexible seal comprising:
   at least one composite layer made of a composite material that includes at least one fabric and at least one elastomer; and
   at least one flat metal sheet, rigidly connected to said composite layer by the elastomer and including pre-cut lines of weakness in the flexible seal, the pre-cut lines being arranged so as to create petal-shaped regions.

2. The flexible seal according to claim 1, wherein the at least one composite layer includes two composite layers arranged on either side of the metal sheet.

3. The flexible seal according to claim 1, further comprising an anti-friction covering on a surface intended to be positioned towards the interior of the container.

4. The flexible seal according to claim 1, wherein the pre-cut lines are arranged radially with respect to the center of the flexible seal.

5. The flexible seal according to claim 1, wherein said at least one composite layer and the metal sheet are arranged such that at least some of the pre-cut lines of the metal sheet are parallel to at least one direction of the thread of the fabric of the composite material of the composite layer.

6. The flexible seal according to claim 1, wherein the metal sheet is a single part in which said pre-cut lines are made.

7. The flexible seal according to claim 1, wherein the metal sheet comprises recesses for receiving a portion of the elastomer of said at least one composite layer.

8. A missile container, comprising at least one flexible seal, wherein the at least one flexible seal comprises at least one composite layer made of a composite material that includes at least one fabric and at least one elastomer; and at least one flat metal sheet, rigidly connected to said composite layer by the elastomer and including pre-cut lines of weakness in the flexible seal, the pre-cut lines being arranged so as to create petal-shaped regions.

9. A weapons system, comprising at least one missile container according to claim 8.

* * * * *